United States Patent
Ogawa et al.

(10) Patent No.: US 8,142,952 B2
(45) Date of Patent: Mar. 27, 2012

(54) FUEL CELL BATTERY SYSTEM

(75) Inventors: Tomohiro Ogawa, Susono (JP); Kazunori Shibata, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 343 days.

(21) Appl. No.: 12/377,062

(22) PCT Filed: Aug. 9, 2007

(86) PCT No.: PCT/IB2007/002304
§ 371 (c)(1),
(2), (4) Date: Feb. 10, 2009

(87) PCT Pub. No.: WO2008/017942
PCT Pub. Date: Feb. 14, 2008

(65) Prior Publication Data
US 2010/0173219 A1    Jul. 8, 2010

(30) Foreign Application Priority Data
Aug. 11, 2006 (JP) ................... 2006-219280

(51) Int. Cl.
*H01M 8/04* (2006.01)
*H01M 8/24* (2006.01)

(52) U.S. Cl. ........ 429/458; 429/456; 429/457; 429/459; 429/461

(58) Field of Classification Search .......... 429/456, 429/457, 458, 459, 460, 461
See application file for complete search history.

(56) References Cited

U.S. PATENT DOCUMENTS

| | | |
|---|---|---|
| 6,423,434 B1 | 7/2002 | Pratt et al. |
| 2003/0022031 A1 | 1/2003 | Manery |
| 2003/0022036 A1 | 1/2003 | Parr |
| 2003/0022042 A1* | 1/2003 | Wells et al. ............. 429/23 |
| 2004/0202909 A1* | 10/2004 | Knights et al. .......... 429/32 |
| 2006/0110642 A1* | 5/2006 | Sugiura et al. .......... 429/26 |
| 2008/0311433 A1* | 12/2008 | Fujita ...................... 429/12 |

FOREIGN PATENT DOCUMENTS

| | | |
|---|---|---|
| CA | 2 538 306 | 3/2005 |
| EP | 1 439 593 A2 | 7/2004 |
| JP | 2004-536436 | 12/2004 |
| JP | 2005-243476 | 9/2005 |

OTHER PUBLICATIONS

Office Action for Canadian Patent Appl. No. 2,666,675 dated Apr. 4, 2011.

* cited by examiner

*Primary Examiner* — Ula C Ruddock
*Assistant Examiner* — Frank Chernow
(74) *Attorney, Agent, or Firm* — Finnegan, Henderson, Farabow, Garrett & Dunner, LLP

(57) ABSTRACT

A fuel cell battery (2) has a structure in which a plurality of cells are stacked and in-series connected. The cells include a cell (15), and one or more cells (16) of a cell stack (11). Hydrogen that has entered the fuel cell battery (2) from a channel (12) is supplied to each cell through a supply manifold (13). After the amount of hydrogen needed for power generation is consumed, gas is discharged as a fuel off-gas into a discharge manifold (14), and then flows into the cell (15). This prevents impurities contained in the fuel off-gas from being accumulated in the cells (16), and causes the impurities to be accumulated in the cell (15). Thus, variations in the amount of power generation among the cells can be restrained in a fuel cell battery system that employs a dead-end method.

9 Claims, 6 Drawing Sheets

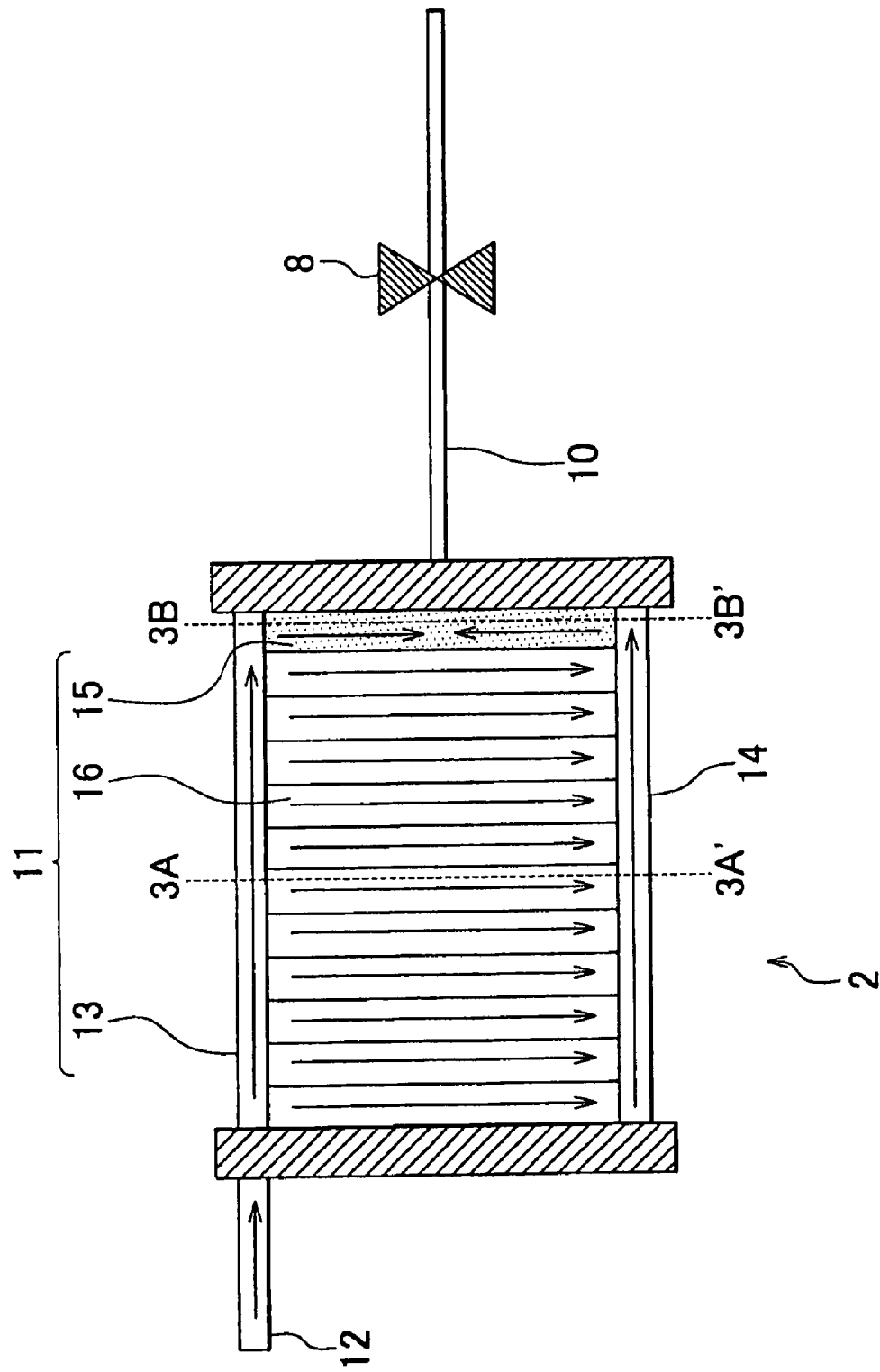

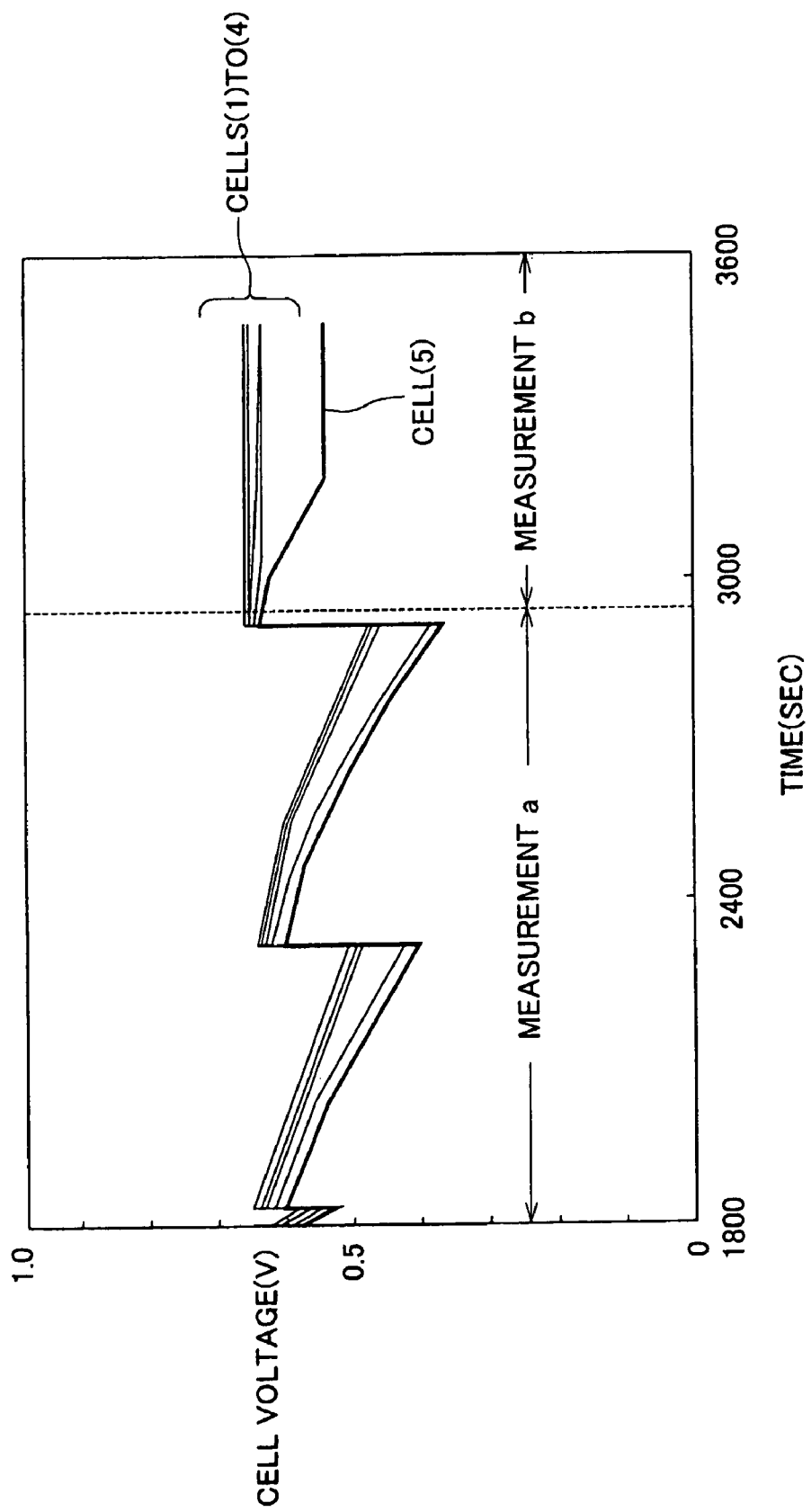

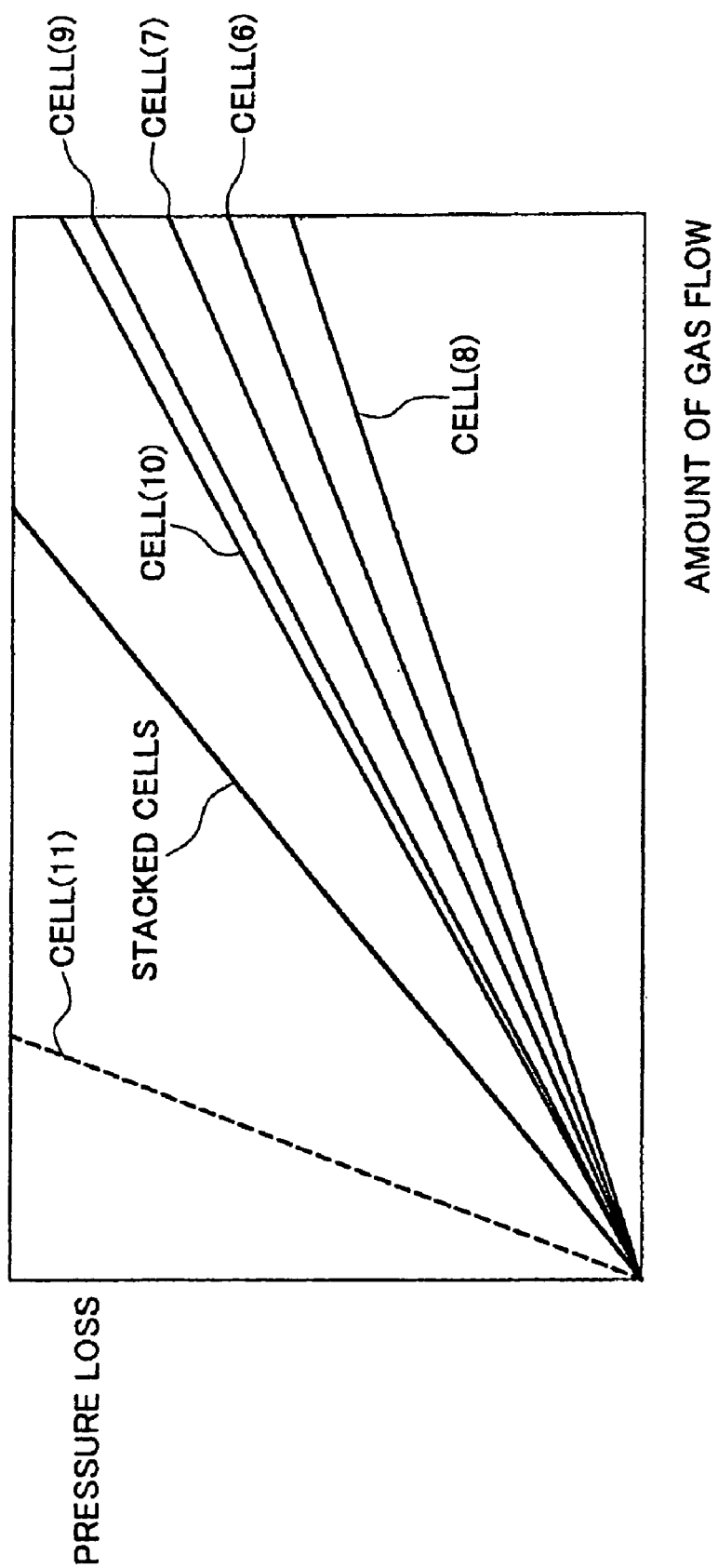

FUEL CELL BATTERY SYSTEM

CROSS-REFERENCE TO RELATED APPLICATIONS

This application is a national phase application of International Application No. PCT/IB2007/002304, filed Aug. 9, 2007, and claims the priority of Japanese Application No. 2006-219280, filed Aug. 11, 2006, the contents of both of which are incorporated herein by reference.

BACKGROUND OF THE INVENTION

1. Field of the Invention

The invention relates to a fuel cell battery system and, particularly, to a fuel cell battery system that operates a fuel cell battery while a channel of a fuel off-gas is closed.

2. Description of the Related Art

A fuel cell battery has a fuel cell stack in which a plurality of cells is stacked. Each cell is formed by, for example, stacking a membrane-electrode assembly (MEA) and separators. The membrane-electrode assembly has an electrolyte membrane made of an ion exchange resin, an anode provided on one of two surfaces of the electrolyte membrane, and a cathode provided on the other surface of the electrolyte membrane. Besides, each of the anode and the cathode has a catalyst layer that is disposed in contact with the electrolyte membrane. When each electrode is supplied with a reactant gas, electrochemical reactions occur between the electrodes, and generate electromotive force. Specifically, the reactions occur upon hydrogen (fuel gas) contacting the anode and oxygen (oxidant gas) contacting the cathode.

In general, the cathode is supplied with air taken in from the outside by a compressor. On the other hand, the anode is supplied with hydrogen stored in a high-pressure hydrogen tank. A method of supplying hydrogen to the anode is a dead-end method (e.g., see Published Japanese Translation of PCT application No. 2004-536436 (JP-A-2004-536436)). In this method, the system is operated while a hydrogen channel is closed, so that the anode is supplied with an amount of hydrogen that corresponds to the amount of hydrogen consumed.

In the case of the dead-end type fuel cell battery system, the amount of impurities dwelling in the channel of the fuel gas increases as time elapses. For example, nitrogen contained in the air supplied to the cathode permeates through the electrolyte membrane, and is accumulated in the anode side. Since the anode-side pressure is adjusted so as to be equal to a predetermined value, an increase in the amount of nitrogen relatively reduces the partial pressure of hydrogen, resulting in a reduced voltage of the fuel cell battery. Therefore, in Published Japanese Translation of PCT application No. 2004-536436 (JP-A-2004-536436), a purge valve that discharges impurities from the channel of, hydrogen is provided, and the purge valve is opened so as to recover the voltage.

Generally, the fuel cell stack is provided with a supply manifold that distributes hydrogen to individual cells, and a discharge manifold that collectively discharges fuel off-gas from the individual cells. Besides, the cells have pressure losses that vary due to variations caused in manufacture. In a cell with high pressure loss, hydrogen is less easily introduced into the cell from the supply manifold than in a cell with low pressure loss. On the other hand, the fuel off-gas discharged from the cells to the discharge manifold is likely to be sucked into cells whose pressure loss is high. Therefore, impurities likely to deposit in cells whose pressure loss is high, and the voltage declines starting with such cells. This gives rise to a problem of the amount of electric power generation varying among cells.

In the fuel cell battery system described in Published Japanese Translation of PCT application No. 2004-536436 (JP-A-2004-536436), the voltage of the cells disposed at a gas outlet-side terminal end of the fuel cell stack is measured. By comparing the thus-measured value with a threshold value, the timing of opening the purge valve is determined. However, Published Japanese Translation of PCT application No. 2004-536436 (JP-A-2004-536436) does not pay attention to differences in the amount of deposit of impurities resulting from varying pressure losses of the cells, and therefore may fail to resolve the variations in the amount of electric power generation among the cells.

SUMMARY OF THE INVENTION

It is an object of the invention to restrain the variation in the power generation amount among the cells in a fuel cell battery system that employs a dead-end method.

A first aspect of the invention is a fuel cell battery system which has a fuel cell battery that includes a plurality of cells that are stacked and in-series connected, a supply manifold that distributes a fuel gas to each of the cells, and a discharge manifold into which a fuel off-gas is discharged from each of the cells, and which operates the fuel cell battery in a state where the fuel off-gas substantially stagnates within the fuel cell battery, the fuel cell battery system being characterized in that the plurality of cells include a first cell, and at least one second cell whose gas channel resistance is smaller than the gas channel resistance of the first cell, and that $r<nR$, where $r$ is the gas channel resistance of a cell whose gas channel resistance is greatest among the at least one second cell, and $R$ is a value obtained by combining the gas channel resistances of the first cell and the at least one second cell, and $n$ is a total number of the plurality of cells ($n$ is an integer of 2 or greater).

A second aspect of the invention is a fuel cell battery system which has a fuel cell battery that includes a plurality of cells that are stacked and in-series connected, a supply manifold that distributes a fuel gas to each of the cells, and a discharge manifold into which a fuel off-gas is discharged from each of the cells, and which operates the fuel cell battery in a state where a channel of the fuel off-gas is closed, the fuel cell battery system being characterized in that the plurality of cells include a first cell, and at least one second cell whose gas channel resistance is smaller than the gas channel resistance of the first cell, and that $r<nR$, where $r$ is the gas channel resistance of a cell whose gas channel resistance is greatest among the at least one second cell, and $R$ is a value obtained by combining the gas channel resistances of the first cell and the at least one second cell, and $n$ is a total number of the plurality of cells ($n$ is an integer of 2 or greater).

A third aspect of the invention is a fuel cell battery system which has a fuel cell battery that includes a plurality of cells that are stacked and in-series connected, a supply manifold that distributes a fuel gas to each of the cells, and a discharge manifold into which a fuel off-gas is discharged from each of the cells, and which operates the fuel cell battery in a state where a channel of the fuel off-gas is closed, the fuel cell battery system being characterized in that each of the cells is provided with a cell channel located between the supply manifold and the discharge manifold, and the plurality of cells include a first cell having a communicating portion which connects the supply manifold and the cell channel and whose capacity is $V_1$, and at least one second cell having a communicating portion which connects the supply manifold and the cell channel and whose capacity is $V_2$ ($V_1<V_2$), and that the capacity $V_1$ is determined so that a relationship of $r<nR$ holds, where r is the gas channel resistance of a cell whose gas channel resistance is greatest among the at least one second cell, and R is a value obtained by combining the gas channel resistances of the first cell and the at least one second cell, and n is a total number of the plurality of cells (n is an integer of 2 or greater).

A fourth aspect of the invention is a fuel cell battery system which has a fuel cell battery that includes a plurality of cells that are stacked and in-series connected, a supply manifold that distributes a fuel gas to each of the cells, and a discharge manifold into which a fuel off-gas is discharged from each of the cells, and which operates the fuel cell battery in a state where the fuel off-gas substantially stagnates within the fuel cell battery, the fuel cell battery system being characterized in that the plurality of cells include a first cell, and at least one second cell whose gas channel resistance is smaller than the gas channel resistance of the first cell, and that a catalyst layer of a cathode of a cell whose gas channel resistance is greatest among the plurality of cells is different from the catalyst layers of cells other than the cell whose gas channel resistance is the greatest.

In the first to fourth aspects of the invention, it is permissible that in the first cell, a catalyst layer of a cathode may be supported on a metal. In this case, the catalyst layer may be a platinum black layer, a platinum fine-particle layer or a platinum alloy fine-particle layer.

In the first to fourth aspects of the invention, purge means for purging the fuel off-gas may be connected to the first cell. Particularly in the third aspect, the purge means may be connected to the cell channel of the first cell. Besides, the fuel cell battery system may further include means for estimating or measuring an amount of a component other than the fuel gas which is contained in the fuel off-gas within the first cell, and the purge means may be caused to work when the amount of the component becomes equal to or greater than a predetermined value.

According to the first and second aspects of the invention, the cells constituting the fuel cell battery include the first cell, and the one or more second cells whose gas channel resistance is smaller than that of the first cell, and the relationship of $r<nR$ holds, where r is the gas channel resistance of the cell whose gas channel resistance is the greatest among the second cells, and R is a value obtained by combining the gas channel resistances of the first cell and the second cells, and n is the total number of the plurality of cells (n is an integer of 2 or greater). Therefore, the fuel off-gas can be actively caused to flow into the first cell, so that impurities can be concentrated in the first cell. Since this prevents accumulation of impurities in the second cells, it becomes possible to restrain variations in the amount of electric power generation among the cells.

According to the third aspect of the invention, the cells constituting the fuel cell battery include the first cell having a communicating portion which connects the supply manifold and the cell channel and whose capacity is $V_1$, and the one or more second cells having a communicating portion which connects the supply manifold and the cell channel and whose capacity is $V_2$ ($V_1<V_2$), and the capacity $V_1$ is determined so that the relationship of $r<nR$ holds, where r is the gas channel resistance of the cell whose gas channel resistance is the greatest among the second cells, and R is a value obtained by combining the gas channel resistances of the first cell and the second cells, and n is the total number of the plurality of cells (n is an integer of 2 or greater). Therefore, the fuel off-gas can be actively caused to flow into the first cell, so that impurities can be concentrated in the first cell. Since this prevents accumulation of impurities in the second cells, it becomes possible to restrain variations in the amount of electric power generation among the cells.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 2 is a schematic diagram illustrating the flow of a gas in a fuel cell battery shown in FIG. 1;

FIG. 4 shows an example of time-dependent changes in the cell voltage in this embodiment;

FIG. 6 is a diagram showing an example of the relationship between the amount of flow of gas and the pressure loss in this embodiment.

DETAILED DESCRIPTION OF EMBODIMENTS

Figure 1:
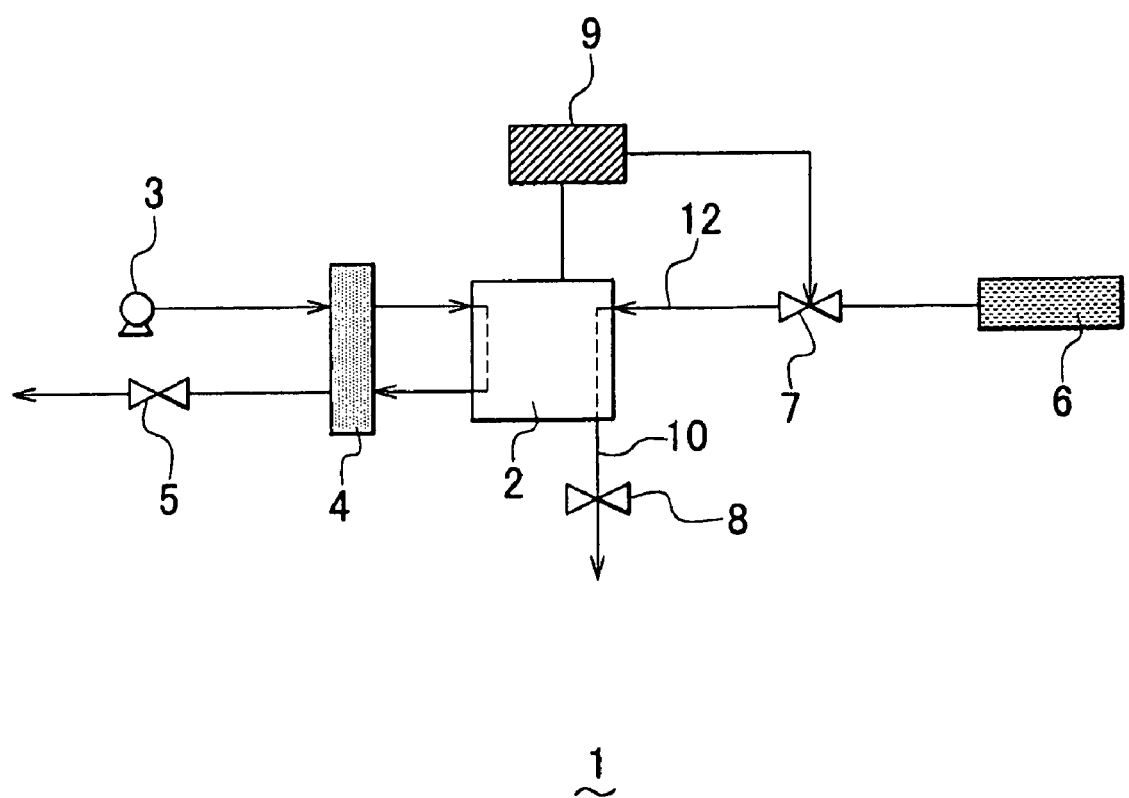
FIG. 1 is a construction diagram of a fuel cell battery system in accordance with an embodiment of the invention.

A fuel cell battery system in accordance with an embodiment of the invention will be described with reference to FIGS. 1 to 6. In FIGS. 1 to 3 and FIGS. 5A and 5B, the same reference numerals represent the same portions.

FIG. 1 is an example of a construction diagram of the fuel cell battery system in accordance with this embodiment. This fuel cell battery system is applicable to various uses, such as uses as a vehicle-mounted type, a floor-mounted type, etc.

As shown in FIG. 1, the fuel cell battery system 1 includes a fuel cell battery 2, a compressor 3 that supplies compressed air to the fuel cell battery 2, a humidifier 4 that recovers moisture contained in an oxidizer off-gas discharged from the fuel cell battery 2 and humidifies the air to be supplied to the fuel cell battery 2, an air pressure regulating valve 5 that adjusts the pressure of the air supplied from the compressor 3 to the fuel cell battery 2, a hydrogen tank 6 that stores dry hydrogen in a high-pressure state, a hydrogen pressure regulating valve 7 that adjusts the pressure of hydrogen supplied from the hydrogen tank 6 to the fuel cell battery 2, and a purge valve 8 provided on a channel 10 of a fuel off-gas discharged from the fuel cell battery 2. By opening the purge valve 8, the fuel off-gas can be purged.

In the fuel cell battery system 1, the supply of hydrogen to anodes (not shown) is carried out by the dead-end method. That is, when the purge valve 8 is closed, the channel 10 of the fuel off-gas is shut down, so that the supply of hydrogen is carried out only as the supply from the hydrogen tank 6. According to this dead-end method, the hydrogen supplied is entirely consumed by the reactions that occur in the fuel cell battery 2. Then, only the same amount of hydrogen as the amount consumed is newly supplied to the anodes.

Incidentally, the fuel gas supplied to the anodes is not limited to hydrogen. For example, as a hydrogen source to be supplied to the anodes, it is possible to utilize a reformed gas generated by the reforming reaction of a hydrocarbon-based compound. The hydrocarbon-based compound used in this case may be a natural gas containing methane as a main component; an alcohol such as methanol or the like, gasoline, or the like. Then, in accordance with the kind of the hydrocarbon-based compound used, a catalyst and a temperature suitable to the reforming reaction are selected. In this manner, a hydrogen-rich reformed gas containing hydrogen, carbon dioxide and water is generated.

FIG. 2 is a schematic illustration of the flow of gas in the fuel cell battery 2 shown in FIG. 1. Arrows show the directions of flow of gas.

In FIG. 2, the fuel cell battery 2 has a stack structure in which a plurality of cells are stacked and in-series connected. The plurality of cells include a cell 15 and a cell stack 11. The cell 15 may be regarded as a first cell in the invention, and is one cell in this embodiment. On the other hand, the cell stack 11 is formed by stacking a plurality of cells 16 of the same kind. Herein, the cells of the same kind are cells of the same shape, and include cells that have differences in the pressure loss caused by the pressure loss variations originating from the manufacture thereof. Besides, each of the cells 16 may be regarded as a second cell in the invention. The total number of the cells 16 merely needs to be one or more, and is not limited by the example of FIG. 2.

The hydrogen that has entered the fuel cell battery 2 from a channel 12 is supplied to each cell through a supply manifold 13. After the amount of hydrogen needed for the electric power generation is consumed, the resultant gas is discharged as fuel off-gas from the cells into a discharge manifold 14.

In the embodiment, the fuel off-gas discharged into the discharge manifold is actively caused to flow into a specific cell. The example shown in FIG. 2 is constructed so that the fuel off-gas discharged from the cells 16 flows into the cell 15 that is located at the fuel off-gas outlet-side end. This construction can prevent impurities, such as nitrogen and the like, contained in the fuel off-gas, from being accumulated in the cells 16, and can cause the impurities to be accumulated in the cell 15.

Figure 3A:
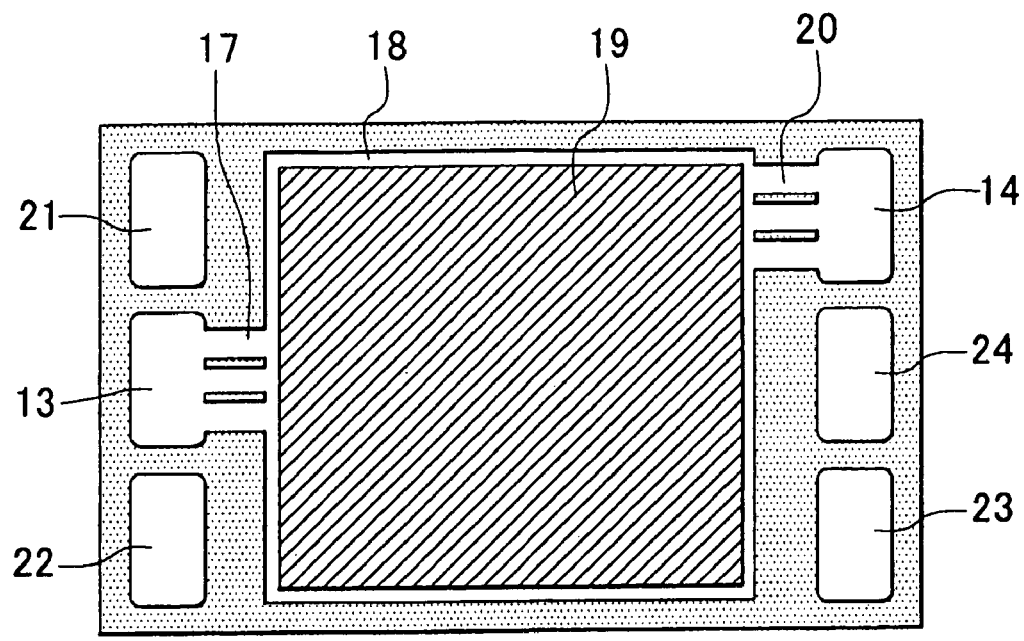
FIG. 3A is a schematic sectional view taken on line 3A-3A' of FIG. 2.

FIG. 3A is a schematic sectional view taken on 3A-3A' of FIG. 2, showing an arbitrary one of the cells 16.

In FIG. 3A, hydrogen introduced from the supply manifold 13 passes through a communicating portion 17 whose capacity is $V_2$, and is supplied to an anode 19 via a cell channel 18. After a necessary amount of hydrogen is consumed on the anode 19, hydrogen, together with impurities, such as nitrogen and the like, passes through a communicating portion 20, and is discharged into the discharge manifold 14.

In FIG. 3A, reference numeral 21 represents an air supply manifold, and 22 represents a cooling water supply manifold, and 23 represents an air discharge manifold, and 24 represents cooling water discharge manifold. However, in this embodiment, the positions of the manifolds for supplying or discharging hydrogen, air and cooling waters are not limited to those shown in this drawing.

Figure 3B:
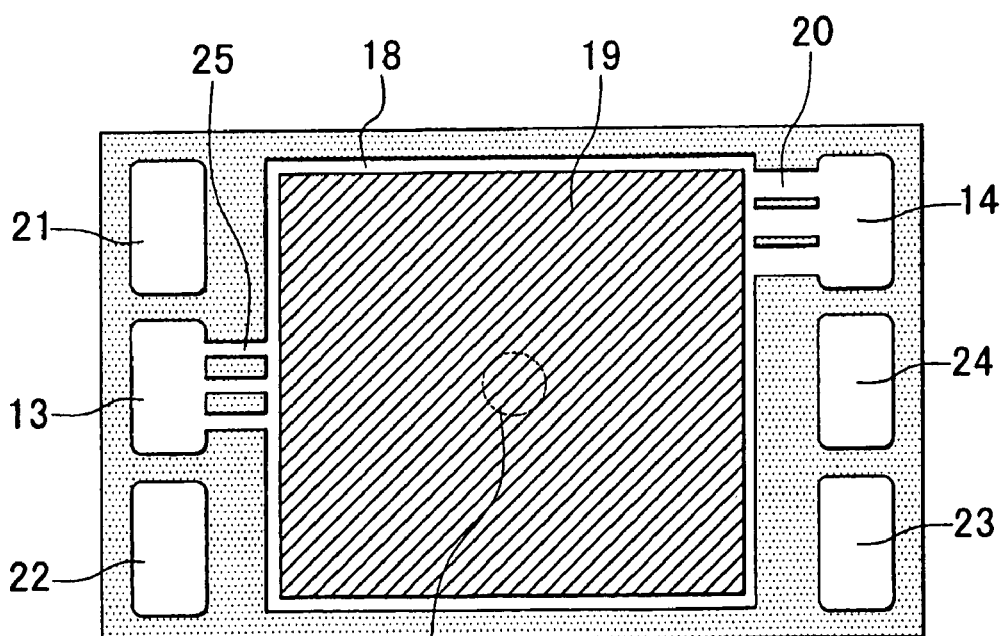
FIG. 3B is a schematic sectional view taken on line 3B-3B' of FIG. 2.

FIG. 3B is a schematic sectional view of the cell 15 taken on line 3B-3B of FIG. 2. The same reference numerals as in FIG. 3A represent the same portions.

In FIG. 3B, hydrogen introduced from the supply manifold 13 passes through a communicating portion 25, and is supplied to the anode 19 via the cell channel 18. It is to be noted herein that the communicating portion 25 has a capacity of $V_1$ ($V_1 < V_2$), that is, the structure thereof has a smaller capacity, more specifically, the structure thereof has a smaller sectional area, than the structure of the communicating portion 17 shown in FIG. 3A. Therefore, the amount of hydrogen that flows into the cell channel 18 is smaller in the cell 15 shown in FIG. 3B than in the cell 16 shown in FIG. 3A.

After a necessary amount of hydrogen is consumed on the anode 19, the fuel off-gas is discharged into the discharge manifold 14 through the communicating portion 20. It is to be noted herein that in the cell 15, since the capacity of the communicating portion 25 is relatively small, the amount of flow of hydrogen into the cell channel 18 is also relatively small, so that the flow velocity of the fuel off-gas discharged into the discharge manifold 14 becomes slower in the cell 15 than that in the cell 16. Therefore, the fuel off-gas discharged from the cell 16 into the discharge manifold 14 flows into the cell channel 18 of the cell 15 through the communicating portion 20 of the cell 15. Therefore, it becomes possible to prevent impurities, such as nitrogen and the like, contained in the fuel off-gas from being accumulated in the cells 16, and cause the impurities to be accumulated in the cell 15. This will be further described below.

The pressure loss of a cell can be found by measuring the pressure difference between the supply manifold and the discharge manifold. Then, since pressure loss is proportional to current density, the supply of hydrogen to the anode is considered to be caused not by diffusion but by formation of a field of flow.

The pressure losses of the cells vary due to the variations originating from the manufacture. In cells whose pressure loss is high, hydrogen is less likely to be introduced into the cells from the supply manifold than in cells whose pressure loss is low. On the other hand, the fuel off-gas discharged into the discharge manifold is likely to be sucked into cells whose pressure loss is high. Therefore, in the related-art fuel cell batteries, impurities are likely to deposit in cells whose pressure loss is high. In this embodiment, however, a cell having higher pressure loss than other cells is intentionally provided, and a construction is provided which causes the fuel off-gas discharged from the other cells to flow into the cell whose pressure loss is high.

In the example of FIG. 3B, the pressure loss of the cell 15 is made higher than the pressure loss of the cell 16 by making the capacity of the communicating portion 25 smaller. In the cell 15, since the amount of flow of hydrogen from the supply manifold 13 is small, gas is sucked in from the discharge manifold 14 as well. Specifically, since the fuel off-gas discharged from the cell 16 flows into the cell 15, it is possible to prevent impurities from being accumulated in the cells 16 and cause impurities to be accumulated in the cell 15.

The pressure loss of the cell 15 needs to be higher than the highest value of the pressure losses of the cells 16. That is, a feature of this embodiment is the intentional provision of a cell whose pressure loss is not within the range of variations of the pressure loss resulting from the causes related to the manufacture, but is a high pressure loss above the range. Therefore, since impurities can be actively accumulated in cells whose pressure loss is high, this embodiment makes it possible to prevent the accumulation of impurities in cells and restrain the decline in the cell voltage even if the cells, when employed in related-art fuel cell batteries, are likely to accumulate impurities.

Figure 5A:
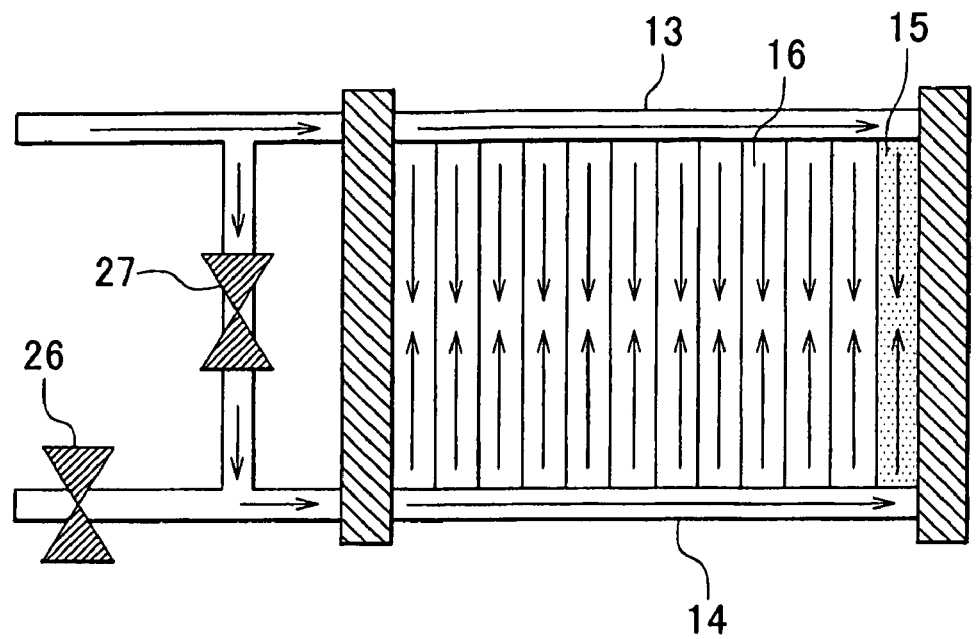
FIGS. 5A and 5B show other examples of the flow of gas in the fuel cell battery in this embodiment.
Figure 5B:
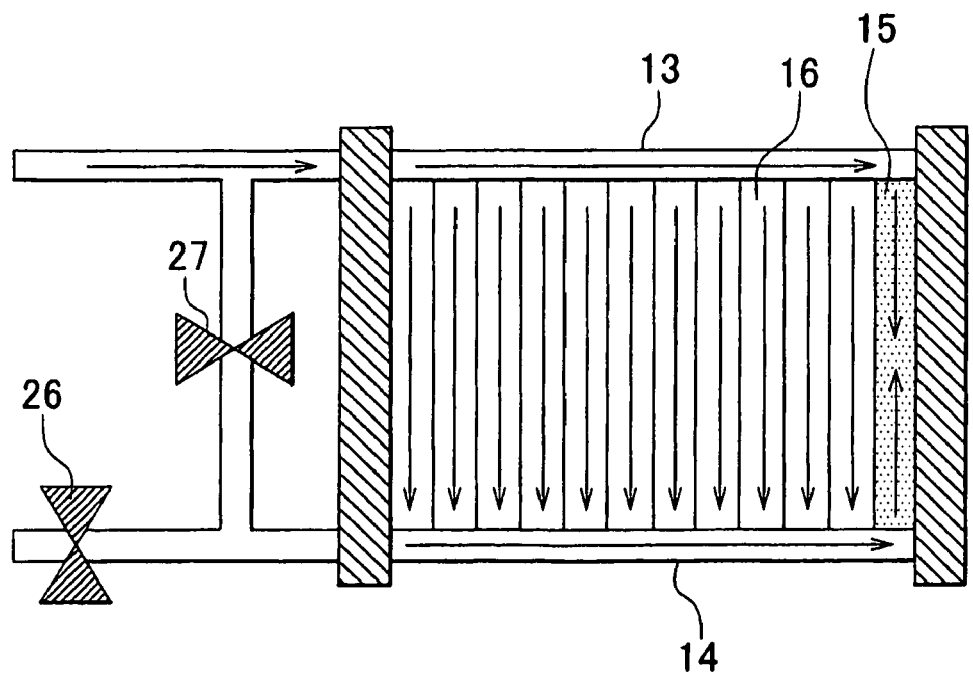

FIG. 4 shows results of measurement of time-dependent changes in the cell voltage in a fuel cell battery shown in FIGS. 5A and 5B. This fuel cell battery is substantially the same in structure as the fuel cell battery shown in FIG. 2, but is different therefrom in the manner of connection of the piping to the fuel cell battery. Incidentally, in FIGS. 5A and 5B, reference numeral 26 represents a purge valve for purging the fuel off-gas.

Firstly, as shown in FIG. 5A, the valve 27 was opened to let hydrogen to flow into the cells via both the supply manifold 13 and the discharge manifold 14 (Measurement a). Then, declines in the voltage of each cell in accordance with the elapse of time were observed as shown in FIG. 4. This is considered to be because the inflow of hydrogen via the discharge manifold 14 prevented impurities from being discharged but caused impurities to be accumulated in each cell. In FIG. 4, cells (1) to (4) have substantially the same structure as shown in FIG. 3A, and a cell (5) has substantially the same structure as shown in FIG. 3B.

Next, as shown in FIG. 5B, the valve 27 was closed to cause hydrogen to flow into the cells only via the supply manifold 13 (Measurement b). In consequence, decline in the voltage was observed in the cell (5) whose communication portion capacity was small, but was hardly observed in the other cells (1) to (4), as shown in FIG. 4. This made it clear that impurities were accumulated in the cell (5) while the accumulation of impurities was restrained in the other cells (1) to (4).

Next, the capacity of the communicating portion 25 of the cell 15 will be considered on the basis of the gas channel resistances of the cell 15 and the cells 16.

In this embodiment, the capacity of the communicating portion 25 of the cell 15 is determined so that the relationship of $r<nR$ holds, where r is the gas channel resistance of the cell whose gas channel resistance is the greatest among all the cells excluding the cell 15, that is, among the at least one cell 16 constituting the cell stack 11, and R is the value obtained by combining the gas channel resistances of all the cells including the cell 15, and n is the total number of the cells (n is an integer of 2 or greater). In this inequality, $R=1/(1/r_1+1/r_2+1/r_3+\ldots+1/r_n)$.

FIG. 6 shows an example of the relationship between the amount of flow of gas and the pressure loss in cells. In this drawing, cells (6) to (10) have substantially the same structure as shown in FIG. 3A, and a cell (11) has substantially the same structure as shown in FIG. 3B. Besides, the slope of the straight line of the stacked cells can be obtained by multiplying a value R obtained by combining the gas channel resistances of the cells (6) to (11) by the total number of cells n. In this case shown in FIG. 6, n=6. In this case, $R=1/(1/r_6+1/r_7+1/r_8+1/r_9+1/r_{10}+1/r_{11})$, where the $r_6$, $r_7$, $r_8$, $r_9$, $r_{10}$ and $r_{11}$ are the gas channel resistances of the cells (6) to (11), respectively.

From FIG. 6, $r_8<r_6<r_7<r_9<r_{10}<r_{11}$, so that, of these cells (6) to (10), the cell (10) has the greatest gas channel resistance. Therefore, the gas channel resistance $r_{10}$ of the cell (10) corresponds to the aforementioned value r. Therefore, the capacity of the communicating portion of the cell (11) is determined so that the relationship of $r<nR$ holds.

In this embodiment, for the cathode of the cell 15, it is permissible to use a catalyst layer that is resistant to the degradation caused by the lack of hydrogen or the abnormal electric potential, concretely, a catalyst layer that is not of the carbon support type. A reason for this is as follows.

In this embodiment, the fuel off-gas is caused to flow into the cell 15, so as to cause impurities to be accumulated in the cell 15. Therefore, the cell 15 reaches a state of low hydrogen concentration and high nitrogen concentration. In the case where carbon is used in the catalyst layer, if the anode reaches a hydrogen-lack state at normal temperature, the reaction between carbon and water ($C+2H_2O \rightarrow CO_2+4H^++4e^-$) proceeds, so that oxidization of carbon occurs on the cathode. Besides, if the nitrogen concentration becomes high, the electric potential rises on the cathode side and the anode side, so that the oxidation of carbon is likely to occur as in the foregoing case. Such reactions can be prevented by the use of a catalyst layer that is not of the carbon support type, so that the degradation of the cell 15 can be restrained. Examples of the catalyst layer that is not of the carbon support type include a platinum black layer, a platinum fine-article layer, a platinum alloy fine-particle layer, etc.

Incidentally, if a cathode catalyst layer that is not of the carbon support type is used in all the cells, declined electric power generation efficiency of the fuel cell battery will result since the performance as a catalyst declines. If a catalyst layer that is not of the carbon support type is used only in the cells that are actively caused to accumulate impurities and a catalyst layer that is of the carbon support type is used in the other cells, decline of the power generation performance of the other cells can be prevented, and the electric power generation performance of the whole fuel cell battery can be improved.

Furthermore, in this embodiment, purge means for purging the fuel off-gas may be connected to a cell that accumulates impurities. For example, as shown in FIGS. 2 and 3B, the channel 10 for purging the fuel off-gas may be connected to the cell channel 18 of the cell 15, and the purge valve 8 may be provided on the channel 10. Since the fuel off-gas discharged from the cells 16 flows into the cell 15, the impurities contained in the fuel off-gas gradually concentrate in the cell 15. If the fuel off-gas can be purged from the cell 15 by opening the purge valve 8, the impurities can be efficiently discharged to the outside. Incidentally, in the cell 15, since gas flows in from the communicating portion 20 connected to the discharge manifold 14, purge is not impeded even if the capacity of the communicating portion 25 connected to the supply manifold 13 is small.

Furthermore, in this embodiment, means for estimating or measuring the amount of impurities in the cell 15 may be provided, and the purge means may be caused to work when the amount of impurities becomes equal to or greater than a predetermined value. In the embodiment, since impurities concentrate in the cell 15, the use of the amount of impurities in the cell 15 as a reference value will allow the purge to be performed at appropriate timing. The impurities may be defined as components other than the fuel gas which are contained in the fuel off-gas. Concretely, the impurities are nitrogen, water, carbon dioxide, etc., and the amount of at least one of these components is estimated or measured.

For example, the time-dependent change in the amount of deposit of impurities may be grasped beforehand, and the purge valve 8 may be opened to perform the purge at every elapse of a predetermined time. Furthermore, the voltage of the cell 15 may be measured, and the purge valve 8 may be opened when the measured value becomes equal to or less than a predetermined value. Furthermore, the voltage of the cell 15 and the voltage of the cells 16 may be measured, and the purge valve 8 may be opened when the voltage difference therebetween becomes equal to or greater than a predetermined value.

As described above, in this embodiment, the fuel off-gas is actively caused to flow from the discharge manifold into a specific cell so that the impurities concentrate in this cell. This can prevent accumulation of the impurities in the other cells, and therefore can restrain variations in the amount of power generation from one cell to another. Specifically, it is possible to restrain variations in the amount of deposit of the impurities among the cells due to the different pressure losses resulting from causes in the manufacture and therefore restrain variations in the amount of electric power generation.

In this embodiment, the voltage of the cell into which the fuel off-gas flows declines as time elapses. However, since the decline of the voltage of the other cells is restrained, the electric power generation characteristic can be improved in view of the fuel cell battery as a whole.

In this embodiment, if the timing of the purge is determined while the cell into which the fuel off-gas flows is regarded as a reference, it becomes possible to perform the purge at appropriate timing in the entire fuel cell battery. Specifically, in the related-art fuel cell batteries, since the cell voltage declining tendency is different due to different pressure losses, the optimum purge timing is different for each cell. Therefore, it is difficult to perform the purge at appropriate timing in the entire fuel cell battery. However, according to the embodiment, since the decline of the cell voltage occurs mainly in the cell into which the fuel off-gas flows, it suffices that the cell into which the fuel off-gas flows be considered as a reference.

It is to be understood that the invention is not limited to the foregoing embodiment, but may be modified in various manners without departing from the spirit of the invention.

For example, in the foregoing embodiment, the cell located at the fuel off-gas outlet-side terminal end is caused to accumulate the impurities. However, this does not limit the invention, and a cell located at a position other than the outlet-side terminal end may also be caused to accumulate the impurities. However, in the case where purge means is provided, if the cell located at the outlet-side terminal end is caused to accumulate the impurities, the connection of the piping is facilitated, and the purge can be efficiently performed.

Furthermore, although in the embodiment, a cell whose pressure loss is high is created by making small the capacity of the communicating portion, this does not limit the invention. For example, a cell whose pressure loss is high can be also created by increasing the channel length of the fuel gas in the cell. Specifically, the invention achieves substantially the same effects as those achieved by the foregoing embodiments if the fuel cell battery system which has a fuel cell battery that includes a plurality of cells stacked and in-series connected, a supply manifold that distributes the fuel gas to each of the cells, and a discharge manifold into which the fuel off-gas is discharged from each of the cells, and which operates the fuel cell battery in a state where a channel of the fuel off-gas is closed has the following features: the plurality of cells include a first cell, and at least one second cell whose gas channel resistance is smaller than the gas channel resistance of the first cell; and a relationship of r<nR holds, where r is the gas channel resistance of the cell whose gas channel resistance is the greatest among the at least one second cell, and R is a value obtained by combining the gas channel resistances of the first cell and the at least one second cell, and n is the total number of the cells (n is an integer of 2 or greater).

Furthermore, the cell channel in the invention may be a porous body channel, or may also be a groove channel. For example, in a cell formed by stacking a membrane-electrode assembly, diffusion layers, porous body channels and separators, the porous body channels may be provided between the separators and the diffusion layers, and the fuel gas may be supplied from the porous body channel to the catalyst layers. Besides, a separator may be provided with a groove, and the fuel gas may be supplied through the groove. Furthermore, it is also permissible that only the cell whose pressure loss is high be provided with a porous body channel, and the other cells be provided with a groove channel.

Although, in the foregoing embodiment, the dead-end operation with the discharge valve completely closed is a basic operation of the fuel cell battery system, a continuously small-amount discharge operation with a slight opening of the discharge valve may instead be set as a basic operation. The continuously small-amount discharge operation is an operation in which the fuel gas stagnates within the fuel cell battery substantially in the same manner as in the dead-end operation, and the opening of the discharge valve is adjusted so that the amount of flow of the fuel off-gas discharged out of the system becomes equal to a value that is very small as compared with the amount of the fuel gas consumed in the fuel cell battery. According to this continuous small-amount discharge operation, since the impurities dwelling in the fuel off-gas discharge manifold can be gradually discharged and the transportation of the impurities from the anode gas channel to the fuel off-gas discharge manifold can be sustained, it becomes possible to keep low the concentration of the impurities in the anode gas channel.

The invention claimed is:

1. A fuel cell battery system which operates a fuel cell battery in a state where a channel of a fuel off-gas is closed, comprising:
    a fuel cell battery that includes
    a plurality of cells stacked and in-series connected,
    a supply manifold that distributes a fuel gas to each of the cells, and
    a discharge manifold into which the fuel off-gas is discharged from each of the cells,
    wherein each of the cells is provided with a cell channel located between the supply manifold and the discharge manifold, and the plurality of cells include a first cell having a first cell channel inlet connecting the supply manifold and the cell channel of the first cell and at least one second cell having a second cell channel inlet connecting the supply manifold and the cell channel of the at least one second cell, the first cell channel inlet having a volume $V_1$ and the second cell channel inlet having a volume $V_2$ greater than $V_1$, and
    wherein the volume $V_1$ is determined so that a relationship of r<nR holds, where r is the gas channel resistance of a cell having a gas channel resistance greatest among the at least one second cell, and R is a value obtained by combining the gas channel resistances of the first cell and the at least one second cell, and n is a total number of the plurality of cells (n is an integer of 2 or greater).

2. The fuel cell battery system according to claim 1, wherein in the first cell, a catalyst layer of a cathode is supported on a metal.

3. The fuel cell battery system according to claim 1, wherein a catalyst layer of a cathode of the first cell is a platinum black layer, a platinum fine-particle layer or a platinum alloy fine-particle layer.

4. The fuel cell battery system according to claim 1, wherein a purge device that purges the fuel off-gas is connected to the first cell.

5. The fuel cell battery system according to claim 4, further comprising an estimating or measuring device that estimates or measures an amount of a component other than the fuel gas which is contained in the fuel off-gas within the first cell, wherein the purge device is caused to work when the amount of the component becomes equal to or greater than a predetermined value.

6. A fuel cell battery system which operates a fuel cell battery in a state where a fuel off-gas substantially stagnates within the fuel cell battery, comprising:
    a fuel cell battery that includes
    a plurality of cells stacked and in-series connected,
    a supply manifold that distributes a fuel gas to each of the cells, and
    a discharge manifold into which the fuel off-gas is discharged from each of the cells,
    wherein each of the cells is provided with a cell channel located between the supply manifold and the discharge manifold, and the plurality of cells include a first cell having a first cell channel inlet connecting the supply manifold and the cell channel of the first cell, and at least one second cell having a second cell channel inlet connecting the supply manifold and the cell channel of the at least one second cell, the first cell channel inlet having a volume $V_1$ and the second cell channel inlet having a volume $V_2$ greater than $V_1$, and wherein a catalyst layer of a cathode of the first cell is different from the catalyst layers of the at least one second cell.

7. The fuel cell battery system according to claim 6, wherein the catalyst layer of the cathode of the first cell is supported on a metal.

8. The fuel cell battery system according to claim 6, wherein the catalyst layer of the cathode of the first cell is a platinum black layer, a platinum fine-particle layer or a platinum alloy fine-particle layer.

9. A fuel cell battery system which operates a fuel cell battery in a state where a channel of a fuel off-gas is closed, comprising:

a fuel cell battery that includes
a plurality of cells stacked and in-series connected,
a supply manifold that distributes a fuel gas to each of the cells, and
a discharge manifold into which the fuel off-gas is discharged from each of the cells,
wherein each of the cells is provided with a cell channel located between the supply manifold and the discharge manifold, and the plurality of cells include a first cell having a first cell channel inlet connecting the supply manifold and the cell channel of the first cell, and at least one second cell having a second cell channel inlet connecting the supply manifold and the cell channel of the at least one second cell, the first cell channel inlet having a volume $V_1$ and the second cell channel inlet having a volume $V_2$ greater than $V_1$.

* * * * *